(No Model.) 2 Sheets—Sheet 1.
A. C. SHELLEY.
VELOCIPEDE.
No. 481,428. Patented Aug. 23, 1892.
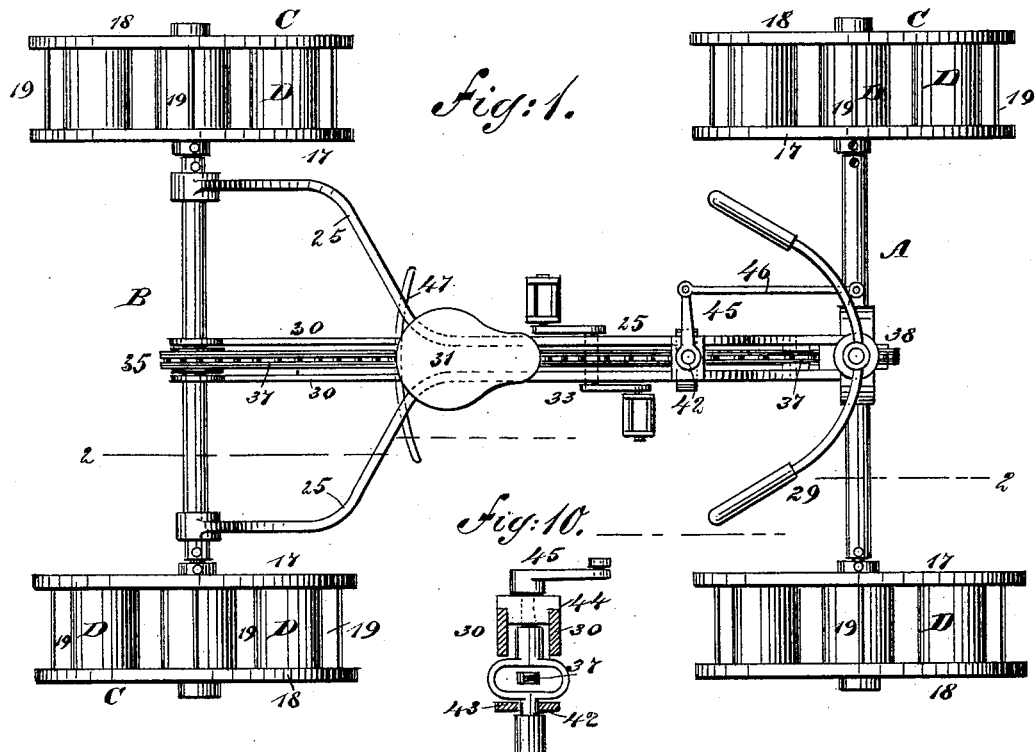
Fig. 1.
Fig. 10.
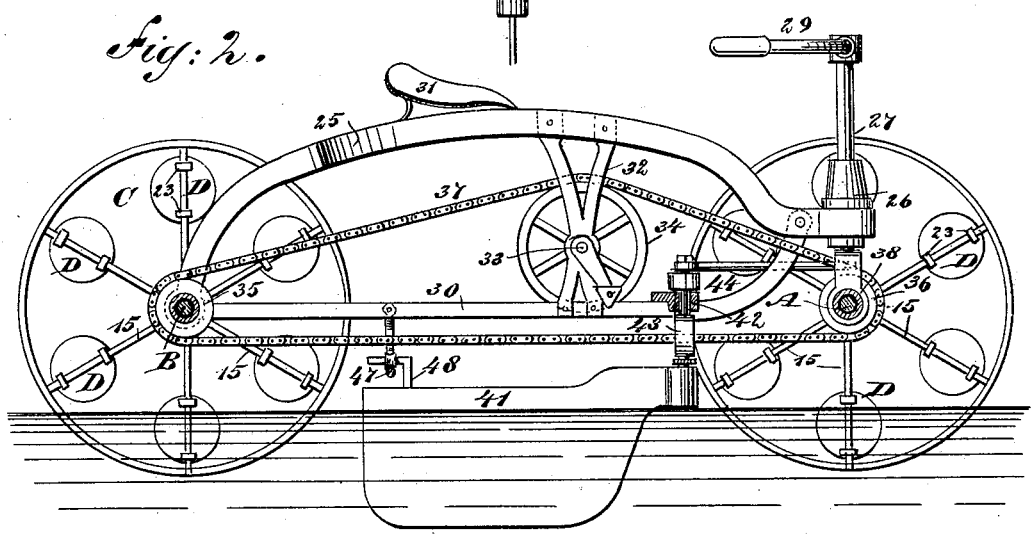
Fig. 2.
WITNESSES:
Chas. Nied.
C. Sedgwick
INVENTOR:
A. C. Shelley
BY Munn & Co
ATTORNEYS (No Model.) 2 Sheets—Sheet 2.
A. C. SHELLEY.
VELOCIPEDE.
No. 481,428. Patented Aug. 23, 1892.
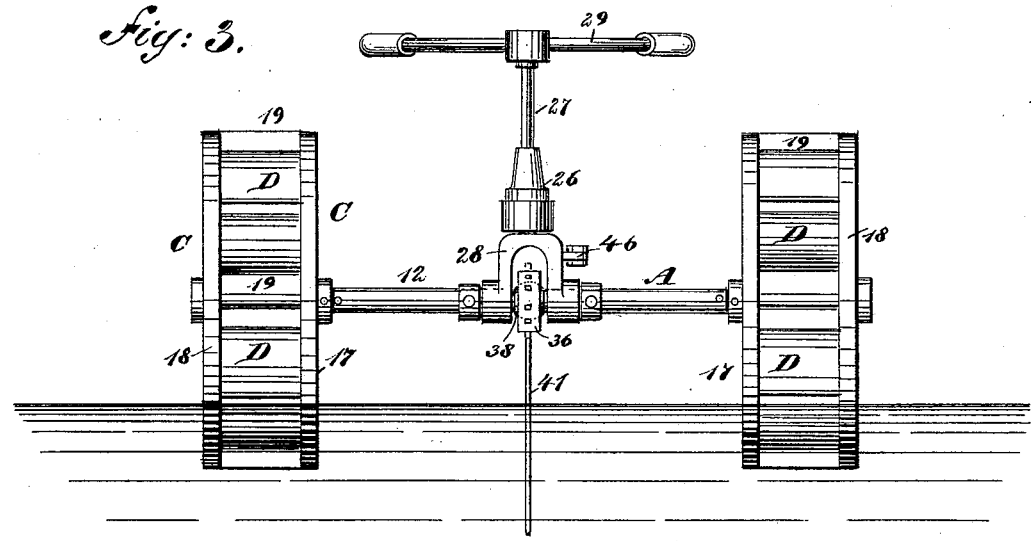
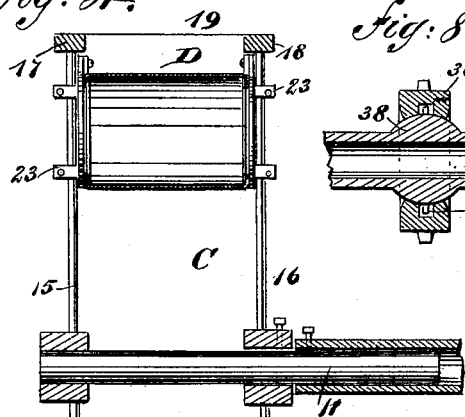
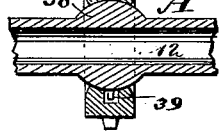
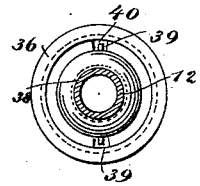
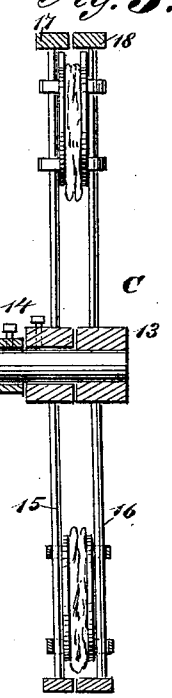
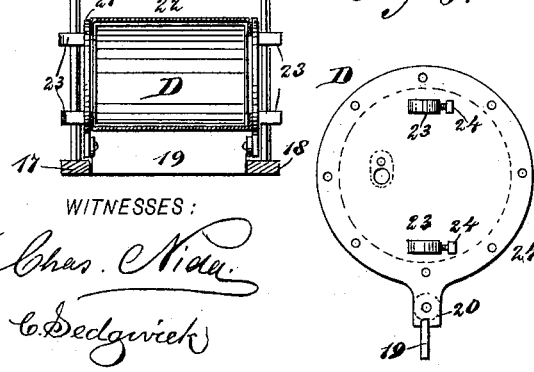
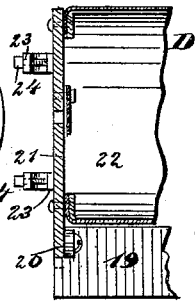
WITNESSES:
Chas. Nida
C. Sedgwick
INVENTOR:
A. C. Shelley
BY
Munn & Co
ATTORNEYS

UNITED STATES PATENT OFFICE.

ABRAM C. SHELLEY, OF BLYTHEBOURNE, NEW YORK.

VELOCIPEDE.

SPECIFICATION forming part of Letters Patent No. 481,428, dated August 23, 1892.

Application filed November 6, 1891. Serial No. 411,040. (No model.)

*To all whom it may concern:*

Be it known that I, ABRAM C. SHELLEY, of Blythebourne, in the county of Kings and State of New York, have invented a new and useful Improvement in Velocipedes, of which the following is a full, clear, and exact description.

My invention relates to an improvement in velocipedes, and has for its object to provide a machine especially adapted for traveling upon water.

A further object of the invention is to so construct the machine that it may be expeditiously and conveniently adjusted in such a manner as to admit of its use also upon land.

Another object of the invention is to so construct the machine that it will ride upon the waves and not plow into or sink therein, and to combine simplicity and economy of construction with durability, lightness, and strength.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine when adjusted to travel upon the water, and Fig. 2 is a longitudinal section taken practically on the line 2 2 of Fig. 1. Fig. 3 is a front elevation of the machine. Fig. 4 is a central vertical section through one of the wheels, it being in position to travel upon the water; and Fig. 5 is a similar view of a wheel when folded to travel upon the land. Fig. 6 is an end view of one of the floats, and Fig. 7 is a partial vertical section through a float. Fig. 8 is a section through the center of the front shaft, illustrating the connection of a driving-wheel therewith. Fig. 9 is a transverse section through the shaft, illustrating the driving-wheel in side elevation; and Fig. 10 is a vertical section through the frame, taken in front of the rudder-post.

The machine is provided with two axles—a front axle A and a rear axle B. Each axle is made in three sections—namely, two solid circular sections 10 and 11 and a sleeve section 12, sliding over the solid sections and uniting them, the sleeve-section being rigidly secured to the solid sections by set-screws or the equivalents thereof. The axles are so made in order that the width of the machine may be reduced by sliding the solid sections in or out of the sleeve-sections.

The wheels C are alike in construction, and each consists of two hubs 13 and 14, two sets of spokes 15 and 16 radiating from the hubs, and two tires 17 and 18, one tire being provided for each set of spokes. The two sections of the wheel are adjustably secured to the solid sections of the axles, the attachment being preferably effected by means of set-screws, and when the two sections of the wheel are pressed together their hubs and tires meet, thereby forming a wheel capable of use upon land.

When the vehicle is to travel upon the water, the two sections of each wheel are carried some distance apart, as illustrated in Fig. 4, and between each two opposed spokes of each wheel a float D is secured. Above each float a paddle 19 is secured between the spokes and fitting snugly to the tires, the paddles being attached to extensions 20, extending from the heads of the floats; but if in practice it is found desirable the paddles may be attached directly to the wheel-spokes and to the tire. The floats D are adapted to be filled with air or with gas in any suitable or approved manner, and consist of two heads 21, preferably formed of metal or some solid material, which heads are connected by the body portions 22 of the floats, each body portion being preferably circular in cross-section and constructed of rubber, leather, or a like yielding or flexible substance, and one gas and air proof.

The means of attaching the floats to the spokes usually consists in forming partial rings 23 upon said heads, as shown in Figs. 6 and 7, and passing set-screws 24 through the rings. The rings being open at one side, the floats are readily attached to the spokes by causing the spokes to enter the rings and then passing set-screws through the rings, as is best shown in Fig. 4. This attachment is a very secure one and enables a person to entirely remove the floats in an expeditious and convenient manner, whenever desired, and as the paddles 19 are preferably attached to the floats both are removed together.

The backbone 25 of the machine is bifurcated at its rear and the members at the bifurcated portion are secured to the rear axle, one at each side of the center. The forward end of the backbone is shaped as a sleeve, and in said sleeve is fitted a bearing-block 26, the said bearing-block being adapted to receive a vertical steering-rod 27, which passes through and has movement in the block, and the lower end of the steering-block is bifurcated, as illustrated at 28 in Fig. 3, the bifurcated portion of the rod being attached to the front axle A, one member at each side of the center of the axle, and the upper end of the steering-rod is provided with any approved form of steering-handle 29.

In addition to the backbone two longitudinal bars 30 are employed, which bars are secured to the central portion of the rear axle at one end and to the front portion of the backbone at the front ends, the bars being spaced some distance apart. The bars 30 and the backbone are connected in front of the driver's seat 31 by a standard or standards 32, in which standards the pedal-shaft 33 is journaled, the said shaft being made to carry a large chain-wheel 34, as is best shown in Fig. 2.

Upon the rear axle B, between the bars 30, a sprocket-wheel 35 is securely fastened, and a second sprocket-wheel 36 is in like manner secured to the front axle A, the front sprocket-wheel being located between the members of the lower bifurcated portion of the steering-rod 27, and an endless chain belt 37 is made to pass over the sprocket-wheels of the axle and also over the chain-wheel 34 upon the pedal-shaft. Thus through the movement of the pedal-shaft both the front and rear axles of the machine are driven at the same time.

As the steering is done principally by turning the front axle to the right or to the left, it is necessary that the axle should have some movement in the front sprocket-wheel 36 and said sprocket-wheel not be carried out of alignment with the wheel upon the rear axle. To accomplish this result, a ball projection 38 is formed upon the central portion of the front axle, the said ball projection being provided with a series of pins 39, and the sprocket-wheel is provided with a spherical inner bore adapted to receive the projection upon the axle, as shown in Fig. 8. The sprocket-wheel is further provided with a series of recesses 40, receiving the pins 39, as is shown in Figs. 8 and 9. By this means it will be seen that a ball-and-socket connection is established between the front sprocket-wheel and the front axle, and that by reason of the pins of the axle fitting into the recesses in the wheel the axle may not only turn in the wheel without carrying the latter out of alignment, but the axle will be constantly driven by the wheel while the latter revolves.

In order to steer the machine when traveling upon the water, it is necessary that a rudder 41 should be employed, which rudder also acts in the capacity of a center-board, preventing the machine from drifting sidewise. The rudder is firmly attached at its forward end to a rudder-post 42, as is shown in detail in Fig. 10. This rudder-post is held to turn in a stirrup 43, forming a portion of the block 44, which block rests upon the top of the bars 30 of the frame. The upper end of the rudder-post is provided with a crank-arm 45, which is connected by a link 46 with the front axle, as is best shown in Figs. 1 and 2. Thus in whatever direction the front axle is turned the rudder will be turned also. It is necessary that the rudder should be guided at its rear or free end. Therefore a traveler 47 is attached to the frame of the machine, through which a bracket 48, secured upon the rudder, extends, said bracket being usually provided with a suitable friction-roller.

When the machine is to travel upon the land, the paddles 19 are removed from the wheels and the wheels are closed, as shown in Fig. 5, or the floats and the paddles also may be removed if it is necessary to travel some distance upon the ground. In traveling but a short distance, however, neither the floats nor the paddles need be removed, as the outer edges of the paddles are below the plane of the outer peripheral surfaces of the tires.

It will be observed that a machine constructed as above described is capable of being used both upon land and upon water. When used upon the land, it is of course necessary that the rudder 41 should be removed; but the rudder, and even the floats and the paddles, may be packed in a very small compass.

The machine is easily propelled, and when the wheels are adjusted close together the solid portions of the axles are slid into the sleeve-section, so that said sections will at all times have bearing at their outer ends against the hubs of the wheels.

Having thus described my invention, I claim as new and desire to secure by Letters Patent—

1. In a velocipede, a wheel formed of two sections adjustable toward and from each other and a series of floats and paddles between the said sections, substantially as and for the purpose set forth.

2. In a velocipede, a wheel formed of two sections adjustable toward and from each other, floats secured between the sections of the wheel, and paddles detachably secured to and between the said sections, substantially as described.

3. In a velocipede, wheels constructed in two sections, one adjustable toward the other, detachable floats connecting the two wheel-sections, said floats comprising stiff heads and flexible bodies, and paddles intervening the sections of the wheels, said paddles being also removable, as and for the purpose specified.

4. In a velocipede, the combination, with the axles and wheels mounted to turn therewith, the said wheels being constructed in two sections, one adjustable toward the other, and provided with floats and paddles removably attached to the sections and intervening them, of a pedal-shaft, a driving mechanism connecting the pedal-shaft and the axles, and a steering device connected with the forward axle, as and for the purpose set forth.

5. In a velocipede of the character described, the combination, with the axles and wheels secured to said axles, the said wheels being constructed in two adjustable sections and provided with removable floats and paddles intervening the sections, of a pedal-shaft, a driving mechanism connecting the pedal-shaft and the axles, a steering apparatus connected with the forward axle, a rudder suspended between the axles, and a connection between said rudder and the steering apparatus, as and for the purpose specified.

ABRAM C. SHELLEY.

Witnesses:
JAMES P. JUDGE,
JAMES P. COLLINS.